(12) United States Patent
Dozen

(10) Patent No.: US 11,042,339 B2
(45) Date of Patent: Jun. 22, 2021

(54) CLIENT APPARATUS, NON-TRANSITORY COMPUTER READABLE RECORDING MEDIUM THAT RECORDS REMOTE ADJUSTMENT MODE MANAGEMENT PROGRAM, AND REMOTE ADJUSTMENT MODE MANAGEMENT SYSTEM

(71) Applicant: KYOCERA DOCUMENT SOLUTIONS INC., Osaka (JP)

(72) Inventor: Kazuki Dozen, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/739,340

(22) Filed: Jan. 10, 2020

(65) Prior Publication Data
US 2020/0249893 A1 Aug. 6, 2020

(30) Foreign Application Priority Data
Feb. 1, 2019 (JP) .............................. JP2019-016796

(51) Int. Cl.
*G06F 3/12* (2006.01)
(52) U.S. Cl.
CPC .......... *G06F 3/1289* (2013.01); *G06F 3/1203* (2013.01); *G06F 3/1232* (2013.01); *G06F 3/1292* (2013.01)
(58) Field of Classification Search
CPC .... G06F 3/1289; G06F 3/1203; G06F 3/1232; G06F 3/1292

USPC ........................................................ 358/1.15
See application file for complete search history.

(56) References Cited

U.S. PATENT DOCUMENTS

2008/0248828 A1* 10/2008 Tomiyasu ......... H04M 1/72597
455/550.1
2017/0295250 A1* 10/2017 Samaranayake ........ H04L 51/24

FOREIGN PATENT DOCUMENTS

| JP | 2006018714 A | 1/2006 |
|---|---|---|
| JP | 2015120273 A | 7/2015 |

* cited by examiner

*Primary Examiner* — Thomas J Lett
(74) *Attorney, Agent, or Firm* — Li & Cai Intellectual Property (USA) Office

(57) ABSTRACT

A client apparatus is configured to establish remote connection with a server apparatus, display, on the display device, information on a basis of a series of operational procedures remotely input in the operation device by the server apparatus, if it is determined that the series of operational procedures input in the operation device is a first series of operational procedures, un-display, on the display device, information on a basis of a series of operational procedures remotely input in the operation device by the server apparatus, subsequently to the first series of operational procedures, if it is determined that the series of operational procedures input in the operation device subsequently to the first series of operational procedures is a second series of operational procedures, start a remote adjustment mode, the remote adjustment mode being a mode for remotely adjusting the client apparatus by the server apparatus.

6 Claims, 5 Drawing Sheets

CLIENT APPARATUS, NON-TRANSITORY COMPUTER READABLE RECORDING MEDIUM THAT RECORDS REMOTE ADJUSTMENT MODE MANAGEMENT PROGRAM, AND REMOTE ADJUSTMENT MODE MANAGEMENT SYSTEM

CROSS-REFERENCE TO RELATED PATENT APPLICATION

This application claims the benefit of Japanese Priority Patent Application JP 2019-016796 filed Feb. 1, 2019, the entire contents of which are incorporated herein by reference.

FIELD OF THE DISCLOSURE

The present disclosure relates to a client apparatus configured to establish remote connection with a server apparatus. The present disclosure further relates to a non-transitory computer readable recording medium that records a remote adjustment mode management program executable by the client apparatus. The present disclosure further relates to a remote adjustment mode management system including the client apparatus and the server apparatus.

BACKGROUND OF THE DISCLOSURE

There is known a technology for executing remote maintenance of a client apparatus by establishing remote connection from a server apparatus to the client apparatus via a network.

SUMMARY OF THE DISCLOSURE

It is desirable to keep high security of a client apparatus in the technology for executing remote maintenance of a client apparatus by a server apparatus.

According to an embodiment of the present disclosure, there is provided a client apparatus, including:
an operation device;
a display device; and
a controller circuit configured to
establish remote connection with a server apparatus,
display, on the display device, information on a basis of
a series of operational procedures remotely input in the operation device by the server apparatus,
if it is determined that the series of operational procedures input in the operation device is a first series of operational procedures,
un-display, on the display device, information on a basis of a series of operational procedures remotely input in the operation device by the server apparatus, subsequently to the first series of operational procedures, and
if it is determined that the series of operational procedures input in the operation device subsequently to the first series of operational procedures is a second series of operational procedures,
start a remote adjustment mode, the remote adjustment mode being a mode for remotely adjusting the client apparatus by the server apparatus.

According to an embodiment of the present disclosure, there is provided a non-transitory computer readable recording medium that records a remote adjustment mode management program executable by a controller circuit of a client apparatus including an operation device and a display device, the remote adjustment mode management program causing the controller circuit of the client apparatus to
establish remote connection with a server apparatus,
display, on the display device, information on a basis of
a series of operational procedures remotely input in the operation device by the server apparatus,
if it is determined that the series of operational procedures input in the operation device is a first series of operational procedures,
un-display, on the display device, information on a basis of a series of operational procedures remotely input in the operation device by the server apparatus, subsequently to the first series of operational procedures, and
if it is determined that the series of operational procedures input in the operation device subsequently to the first series of operational procedures is a second series of operational procedures,
start a remote adjustment mode, the remote adjustment mode being a mode for remotely adjusting the client apparatus by the server apparatus.

According to an embodiment of the present disclosure, there is provided a remote adjustment mode management system, including:
a server apparatus; and
a client apparatus,
the client apparatus including
an operation device,
a display device, and
a controller circuit configured to
establish remote connection with a server apparatus,
display, on the display device, information on a basis of
a series of operational procedures remotely input in the operation device by the server apparatus,
if it is determined that the series of operational procedures input in the operation device is a first series of operational procedures,
un-display, on the display device, information on a basis of a series of operational procedures remotely input in the operation device by the server apparatus, subsequently to the first series of operational procedures, and
if it is determined that the series of operational procedures input in the operation device subsequently to the first series of operational procedures is a second series of operational procedures,
start a remote adjustment mode, the remote adjustment mode being a mode for remotely adjusting the client apparatus by the server apparatus.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. REMOTE ADJUSTMENT MODE MANAGEMENT SYSTEM

Figure 1:
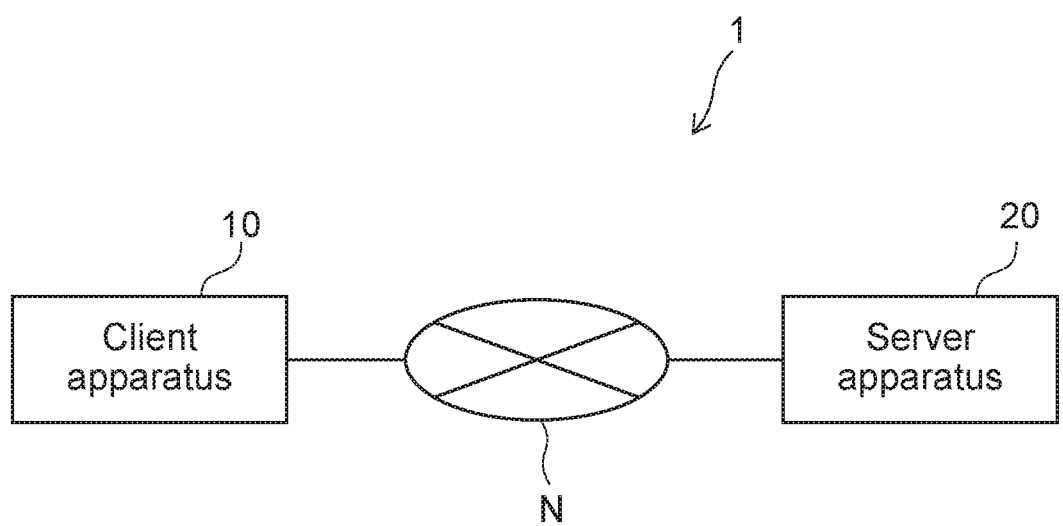
FIG. 1 shows a remote adjustment mode management system according to an embodiment of the present disclosure.

FIG. 1 shows a remote adjustment mode management system according to an embodiment of the present disclosure.

The remote adjustment mode management system 1 includes the client apparatus 10 and the server apparatus 20. The client apparatus 10 and the server apparatus 20 are communicably connected to each other via the network N such as the Internet.

The client apparatus 10 is, for example, an image forming apparatus (Multifunction Peripheral, MFP).

The server apparatus 20 is, for example, a typical personal computer provided at a help desk, call center, or the like for the client apparatus 10. A worker (operator) at the help desk, call center, or the like operates the server apparatus 20. The server apparatus 20 establishes remote connection with the client apparatus 10 via the network N depending on executed operations.

The server apparatus 20 is capable of remotely connecting to the client apparatus 10, and starting and executing a remote guidance mode, a remote maintenance mode, and a remote adjustment mode for the client apparatus 10.

The "remote guidance mode" is, for example, a guidance mode for solving a trouble when the client apparatus 10 has a trouble when a user (end user. The same applies to the following description) is using the client apparatus 10. The "remote maintenance mode" is, for example, a maintenance mode to cope with a relatively small trouble (low image print quality on paper, etc.) by cleaning a drum, for example, which may continuously occur as a result of use of the client apparatus 10. The "remote adjustment mode" is a mode of remotely adjusting the client apparatus 10 by the server apparatus 20 to adjust detailed setting of the client apparatus 10, or to solve a relatively big trouble which is not assumed to occur in a normal use status.

In the "remote guidance mode", it is desirable to display an operation method of the client apparatus 10 on the display device 17a of the client apparatus 10 to show the operation method to a user without fail. In the "remote maintenance mode", it is desirable to display an operation method of the client apparatus 10 on the display device 17a of the client apparatus 10 such that a user may know a method to cope with the similar trouble in the future.

Meanwhile, the "remote adjustment mode" is in contrast to those modes. An operation to adjust detailed setting of the client apparatus 10 and an operation to solve a relatively big trouble which is not assumed to occur in a normal use status are, intrinsically, operations input in the client apparatus 10 by a service person directly (not remotely). So an operation method for starting the "remote adjustment mode" of remotely executing such adjustment and operation methods during the "remote adjustment mode" should not be known by a user intrinsically. Therefore information on a basis of the operation method for starting the "remote adjustment mode" and information on a basis of the operation methods during the "remote adjustment mode" should not be displayed on the display device 17a of the client apparatus 10.

2. HARDWARE CONFIGURATION OF CLIENT APPARATUS

Figure 2:
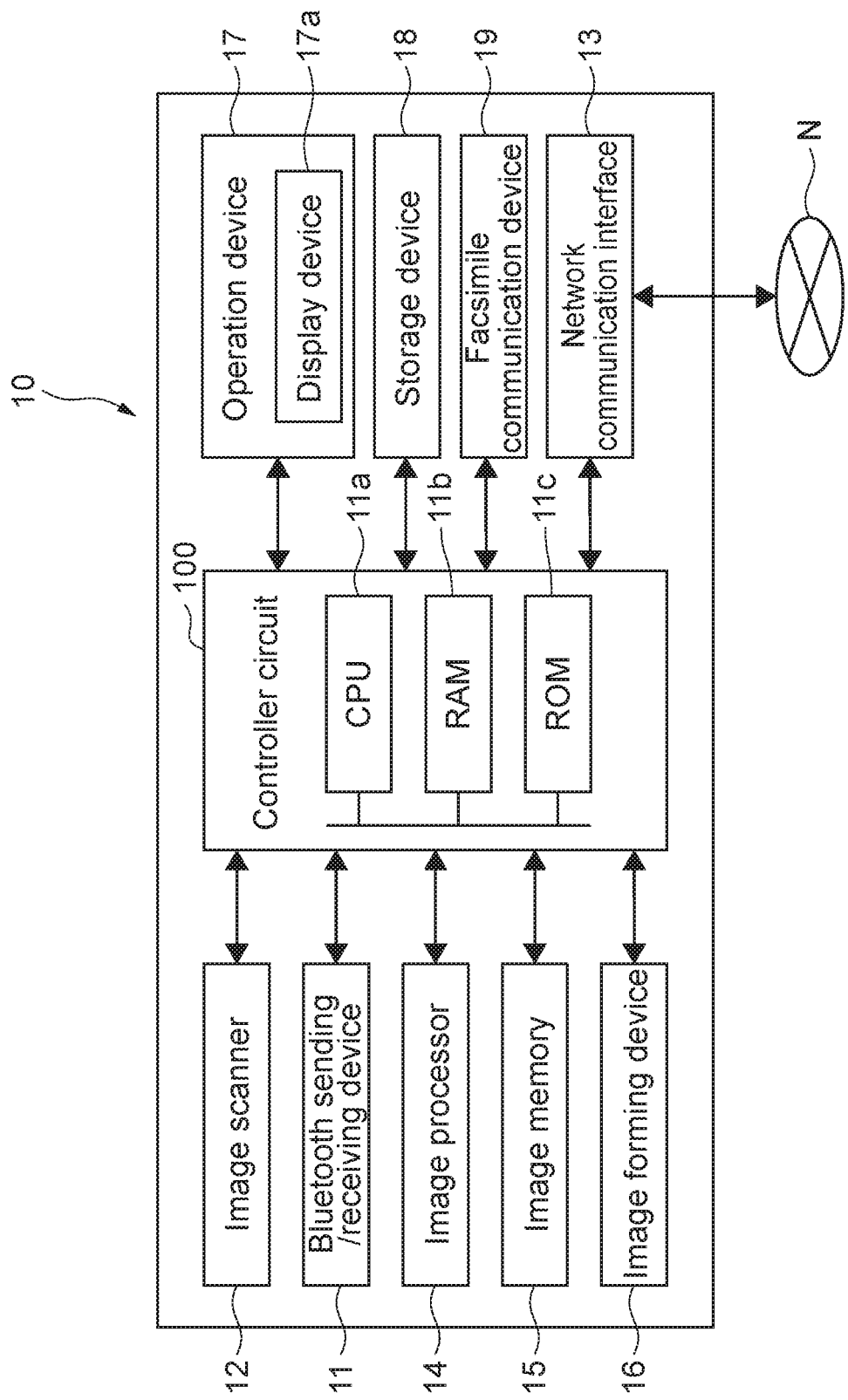
FIG. 2 shows a hardware configuration of a client apparatus.

FIG. 2 shows a hardware configuration of a client apparatus.

A hardware configuration of the client apparatus 10 being an image forming apparatus will be described. The client apparatus 10 includes the CPU (Central Processing Unit) 11a, the RAM (Random Access Memory) 11b, the ROM (Read Only Memory) 11c, dedicated hardware circuits, and the like and performs overall operational control of the image forming apparatus 10. The CPU 11a loads information processing programs stored in the ROM 11c in the RAM 11b and executes the information processing programs. The ROM 11c is a nonvolatile memory that stores programs executed by the CPU 11a, data, and the like. The ROM 11c is an example of a non-transitory computer readable recording medium.

The controller circuit 100 is connected to the Bluetooth (registered trademark) sending/receiving device 11, the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 (touch panel) is one mode of an input device. A sound input device including a microphone may be provided as an input device.

3. HARDWARE CONFIGURATION OF SERVER APPARATUS

Figure 3:
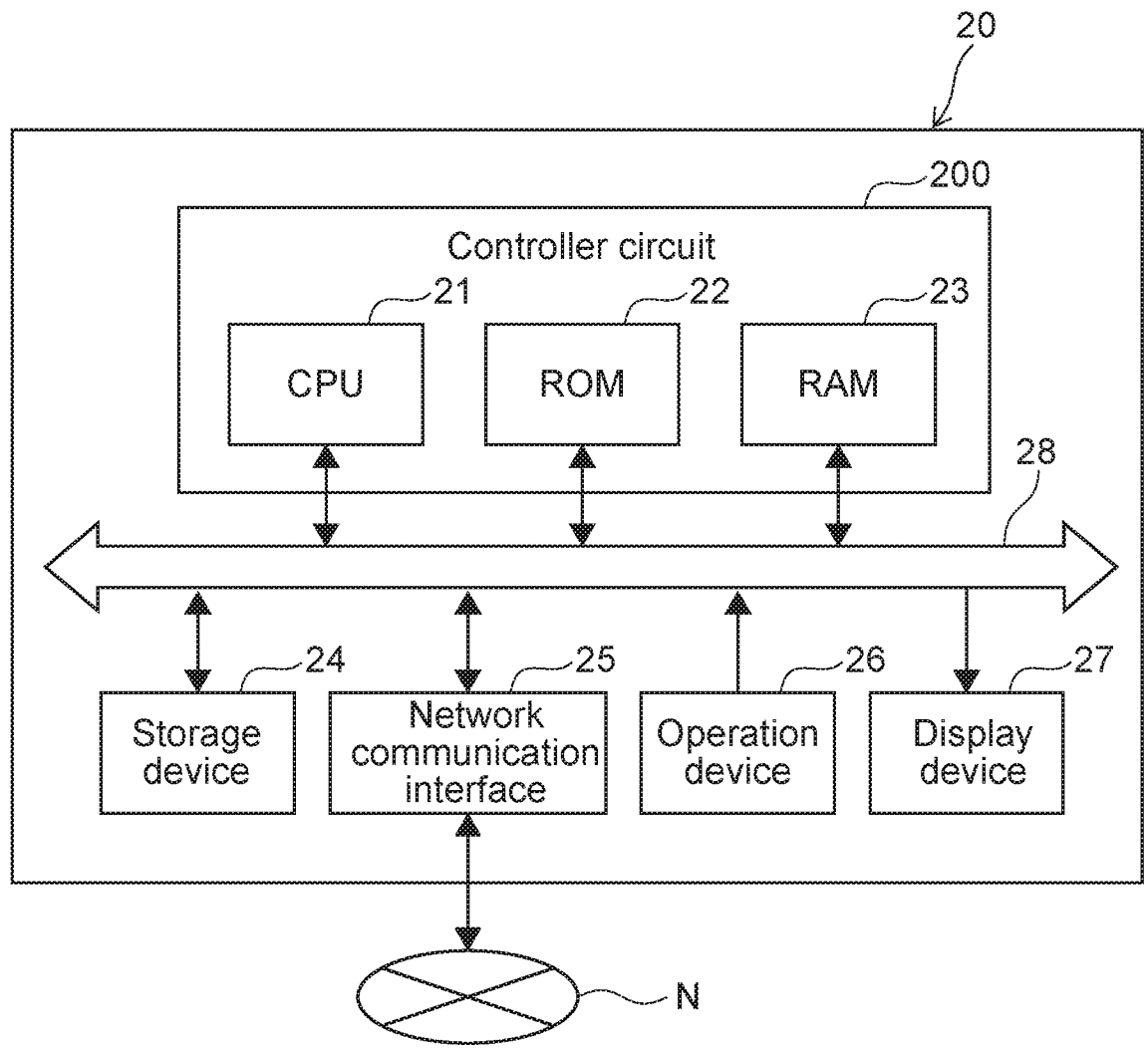
FIG. 3 shows a hardware configuration of a server apparatus.

FIG. 3 shows a hardware configuration of a server apparatus.

The server apparatus 20 includes the CPU 21, the ROM 22, the RAM 23, the storage device 24, which is a large-volume nonvolatile memory such as an HDD or an SSD, the network communication interface 25, the operation device 26, and the display device 27, and the bus 28 connecting them to each other.

The controller circuit 200 includes the CPU 21, the ROM 22, and the RAM 23. The CPU 21 loads information processing programs stored in the ROM 22 in the RAM 23 and executes the information processing programs. The ROM 22 stores programs executed by the CPU 21, data, and the like nonvolatile. The ROM 22 is an example of a non-transitory computer readable recording medium.

4. FUNCTIONAL CONFIGURATION OF CLIENT APPARATUS

Figure 4:
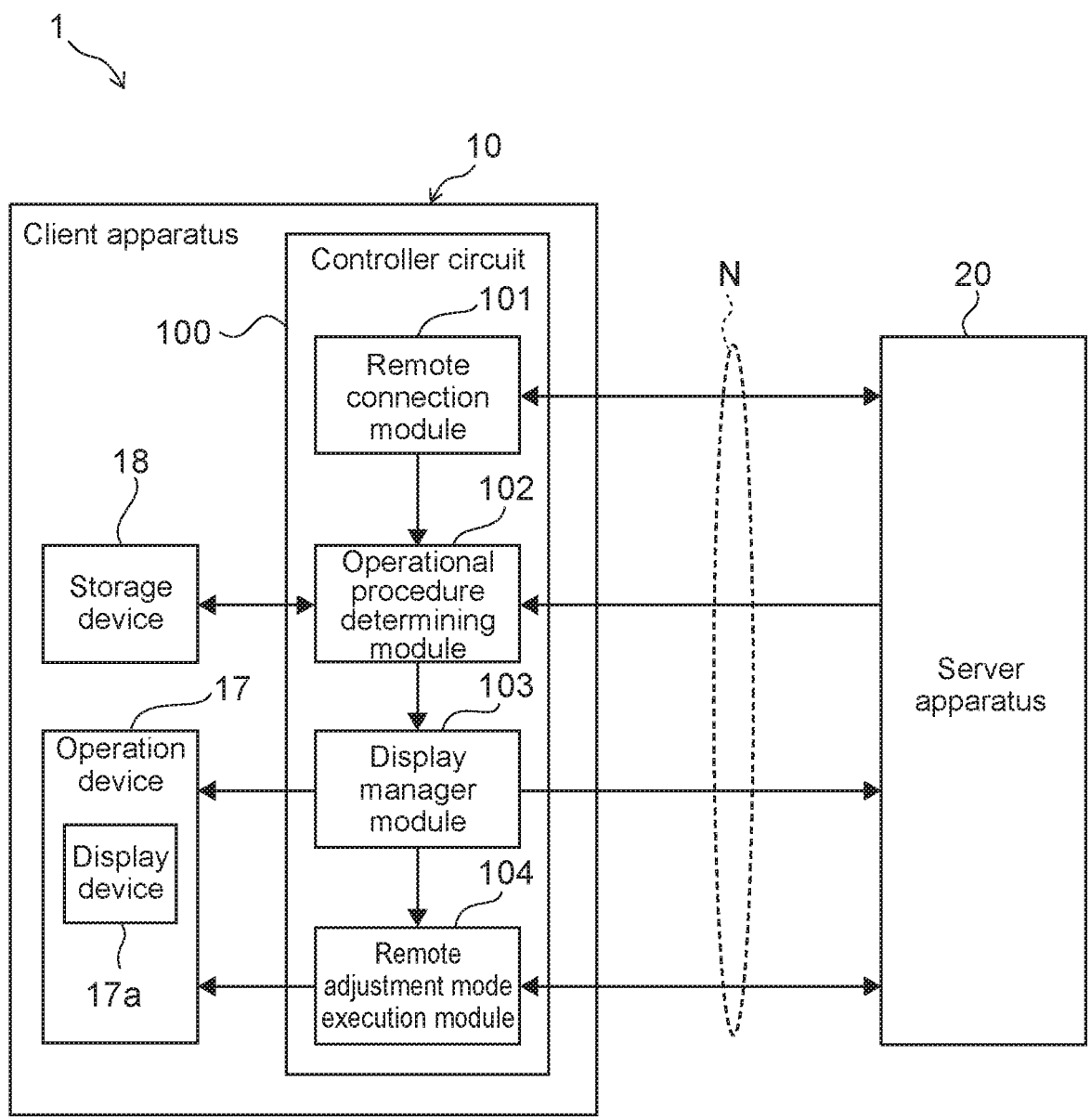
FIG. 4 shows a functional configuration of the client apparatus.

FIG. 4 shows a functional configuration of the client apparatus.

In the controller circuit 100 of the client apparatus 10, the CPU 11 loads an information processing program (remote adjustment mode management program) stored in the ROM 12 in the RAM 13 and executes the information processing program to operate as the remote connection module 101, the operational procedure determining module 102, the display manager module 103, and the remote adjustment mode execution module 104.

The remote connection module 101 establishes remote connection between the client apparatus 10 and the server apparatus 20.

The operational procedure determining module 102 detects a series of remote adjustment mode shifting operational procedures remotely input in the operation device 17 by the server apparatus 20. The "series of remote adjustment mode shifting operational procedures" is a series of operational procedure to start the remote adjustment mode, the remote adjustment mode being a mode for remotely adjusting the client apparatus 10 by the server apparatus 20. The "series of remote adjustment mode shifting operational procedures" is, for example, a series of operational procedures for selecting objects displayed on the display device 17a or hardware keys in predetermined operational procedures. The "series of remote adjustment mode shifting operational procedures" includes a first series of operational procedures which is the former stage, and a second series of operational procedures which is the latter stage subsequent to the first series of operational procedures.

For example, let's say that the "series of remote adjustment mode shifting operational procedures" is a series of operational procedures for selecting objects displayed on the display device 17a being a touch panel or hardware keys in seven predetermined operational procedures. In this case, the first series of operational procedures may be the four operational procedures in the former stage out of the seven operational procedures, and the second series of operational procedures may be the three operational procedures in the latter stage subsequent to the four operational procedures in the former stage.

The display manager module 103 displays, on the display device 17a, information (objects displayed on the display device 17a and hardware keys selected in predetermined operational procedures) on a basis of the first series of operational procedures. Meanwhile, the display manager module 103 un-displays, on the display device 17a, information (objects displayed on the display device 17a and hardware keys selected in predetermined operational procedures) on a basis of the second series of operational procedures subsequent to the first series of operational procedures.

The remote adjustment mode execution module 104 remotely adjusts the client apparatus 10 on a basis of operations remotely input in the operation device 17 by the server apparatus 20.

5. OPERATIONAL FLOW OF CLIENT APPARATUS

Figure 5:
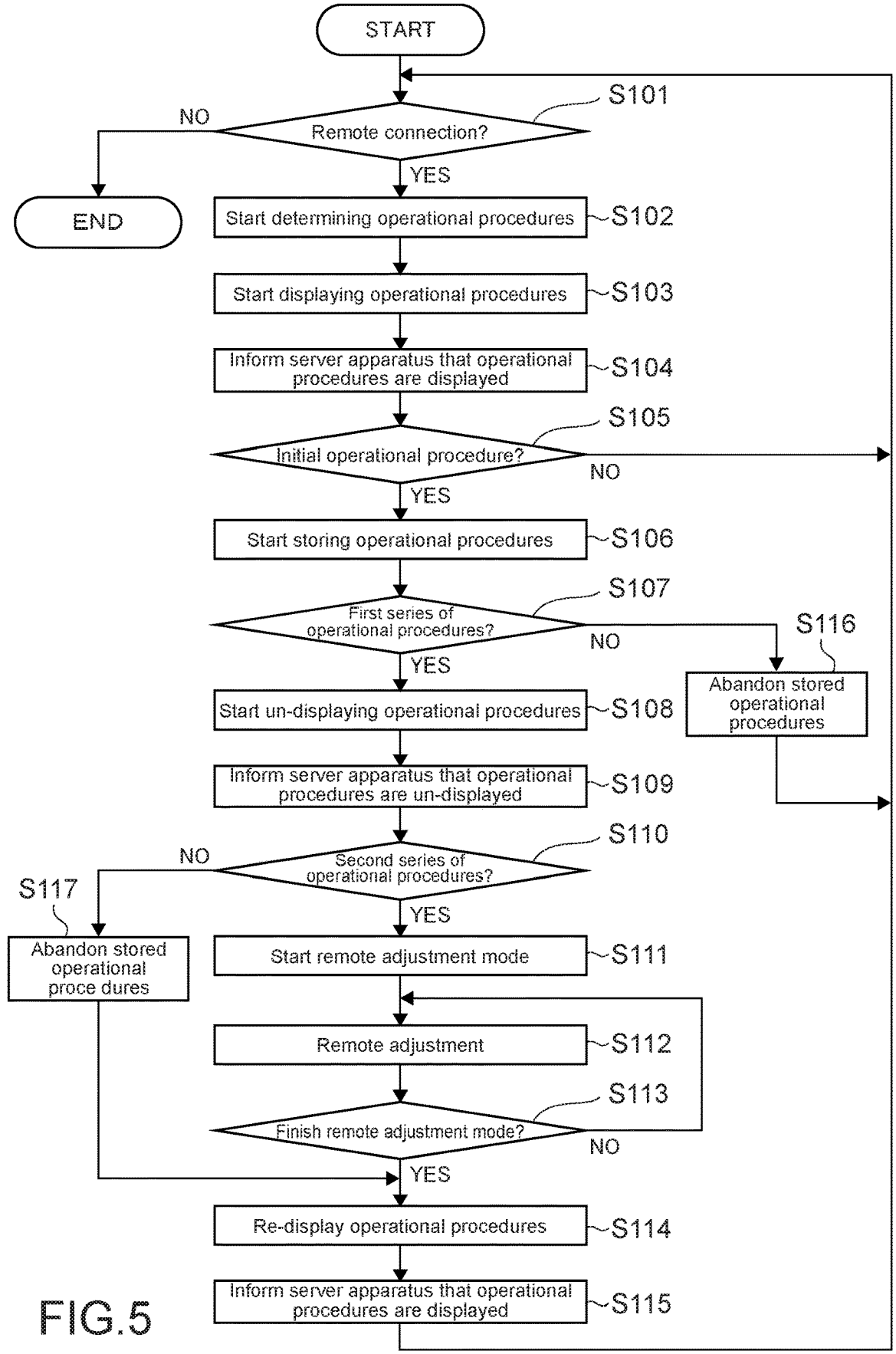
FIG. 5 shows an operational flow of the client apparatus.

FIG. 5 shows an operational flow of the client apparatus.

The remote connection module 101 of the client apparatus 10 receives a remote connection request from the server apparatus 20 via the network. The remote connection module 101 establishes remote connection between the client apparatus 10 and the server apparatus 20 (Step S101, YES).

When the remote connection between the client apparatus 10 and the server apparatus 20 is established, the operational procedure determining module 102 starts determining a series of operational procedures remotely input in the operation device 17 by the server apparatus 20 (Step S102).

The display manager module 103 starts displaying, on the display device 17a, information (selected objects or hardware keys) on a basis of the series of operational procedures remotely input in the operation device 17 by the server apparatus 20 (Step S103). The display manager module 103 informs the server apparatus 20 that information on a basis of the series of operational procedures remotely input in the operation device 17 by the server apparatus 20 is displayed on the display device 17a (Step S104).

The operational procedure determining module 102 detects that one initial operational procedure out of a series of remote adjustment mode shifting operational procedures (i.e., one initial operational procedure of the first series of operational procedures in the former stage out of a series of remote adjustment mode shifting operational procedures) is remotely input in the operation device 17 by the server apparatus 20 (Step S105, YES). Then, the operational procedure determining module 102 starts storing, in the storage device 18, operational procedures on and after the one detected initial operational procedure (Step S106).

The display manager module 103 displays, on the display device 17a, information (selected objects or hardware keys) on a basis of the one initial operational procedure remotely input in the operation device 17 by the server apparatus 20. Further, the display manager module 103 subsequently keeps on displaying, on the display device 17a, information (selected objects or hardware keys) on a basis of operational procedures remotely input in the operation device 17 by the server apparatus 20.

The operational procedure determining module 102 determines that a series of operational procedures (i.e., series of operational procedures stored in the storage device 18 on and after one initial operational procedure) input in the operation device 17 is not a first series of operational procedures (Step S107, NO). In short, the one initial operational procedure is the same as the one initial operational procedure of the first series of operational procedures, but an operational procedure different from the first series of operational procedures is input next or midway. In this case, the operational procedure determining module 102 abandons the operational procedures stored in the storage device 18 (Step S116), and repeats the operations of Step S101 and the following.

Meanwhile, the operational procedure determining module 102 determines that the series of operational procedures (i.e., series of all the operational procedures stored in the storage device 18 on and after the one initial operational procedure) input in the operation device 17 is the first series of operational procedures (Step S107, YES). As described above, the "first series of operational procedures" is a series of operational procedures in the former stage of the series of remote adjustment mode shifting operational procedures (operational procedures for selecting objects and hardware keys in predetermined operational procedures), which is a series of operational procedures for starting the remote adjustment mode.

If the input series of operational procedures is the first series of operational procedures (Step S107, YES), the display manager module 103 un-displays, on the display device 17a, information on a basis of the series of operational procedures subsequent to the first series of operational procedures remotely input in the operation device 17 by the server apparatus 20 (Step S108). In other words, the display manager module 103 keeps on displaying, on the display device 17a, all the information on a basis of the first series of operational procedures. Then the display manager module 103 un-displays, on the display device 17a, the information on a basis of a series of operational procedures input subsequently to the first series of operational procedures. The display manager module 103 informs the server apparatus 20 that information on a basis of a series of operational procedures remotely input in the operation device 17 by the server apparatus 20 is un-displayed on the display device 17a (Step S109).

The operational procedure determining module 102 determines that a series of operational procedures (i.e., series of operational procedures stored in the storage device 18 subsequent to the first series of operational procedures) input in the operation device 17 subsequently to the first series of operational procedures is the second series of operational procedures (Step S110, YES). As described above, the "second series of operational procedures" is a series of operational procedures in the latter stage of the series of remote adjustment mode shifting operational procedures (operational procedures for selecting objects and hardware keys in predetermined operational procedures), which is a series of operational procedures for starting the remote adjustment mode, subsequent to the first series of operational procedures in the former stage. So the fact that the second series of operational procedures is input subsequently to the first series of operational procedures means that the series of remote adjustment mode shifting operational procedures, which is a series of operational procedures for starting the remote adjustment mode in which the server apparatus 20 remotely adjusts the client apparatus 10, is input correctly and completely.

If the series of operational procedures input subsequently to the first series of operational procedures is the second series of operational procedures (Step S110, YES), the remote adjustment mode execution module 104 starts the remote adjustment mode (Step S111).

After that, the server apparatus 20 remotely adjusts the client apparatus 10 via the remote adjustment mode execution module 104 (Step S112). The server apparatus 20 finishes the remote adjustment mode via the remote adjustment mode execution module 104 (Step S113, YES).

After the remote adjustment mode is finished (Step S113, YES), the display manager module 103 re-displays, on the display device 17a, information on a basis of a series of operational procedures remotely input in the operation device 17 by the server apparatus 20 (Step S114). The display manager module 103 informs the server apparatus 20 that information on a basis of a series of operational procedures remotely input in the operation device 17 by the server apparatus 20 is displayed (re-displayed) on the display device 17a (Step S115).

By the way, the operational procedure determining module 102 may determine that a series of operational procedures (i.e., series of operational procedures stored in the storage device 18 subsequent to the first series of operational procedures) input in the operation device 17 subsequently to the first series of operational procedures is not the second series of operational procedures (Step S110, NO). In short, the first series of operational procedures is correctly and completely input, but an operational procedure different from the second series of operational procedures is input next or midway. Typically, since the first series of operational procedures is already input, an operator may would like to start the remote adjustment mode. However, the operator inputs wrong operational procedures in the server apparatus 20 instead of the second series of operational procedures.

In this case, the operational procedure determining module 102 abandons the operational procedure stored in the storage device 18 (Step S117). Specifically, the operational procedure determining module 102 abandons all the first series of operational procedures (which is correctly and completely input) and all the series of operational procedures input after that.

The display manager module 103 displays (re-displays), on the display device 17a, information on a basis of a series of operational procedures after the operational procedure determining module 102 determines that the series of operational procedures is not the second series of operational procedures (Step S114). The display manager module 103 informs the server apparatus 20 that the information on a basis of the series of operational procedures remotely input in the operation device 17 by the server apparatus 20 is displayed (re-displayed), on the display device 17a (Step S115). As a result, an operator may know that the operator has input wrong operational procedures in the server apparatus 20 instead of the second series of operational procedures.

6. CONCLUSION (1) According to the present embodiment, the client apparatus 10 un-displays, on the display device 17a, information on a basis of the series of operational procedures subsequent to the first series of operational procedures remotely input in the operation device 17 by the server apparatus 20 (Step S108). As a result, it is possible to reliably prevent a situation where, when the server apparatus 20 starts the remote adjustment mode, all the information on a basis of operations remotely input in the operation device 17 of the client apparatus 10 by the server apparatus 20 is displayed on the display device 17a, and a user thereby sees all the operational procedures to start the remote adjustment mode. Further, according to the present embodiment, if the client apparatus 10 determines that the series of operational procedures remotely input in the operation device 17 by the server apparatus 20 is the first series of operational procedures (Step S107, YES), the client apparatus 10 un-displays information on a basis of the series of operational procedures (Step S108). In other words, the client apparatus 10 is capable of locally determining a trigger (Step S107, YES) for un-displaying (Step S108). As a result, it is not necessary for an operator who operates the server apparatus 20 to, for example, configure un-display settings and the like of the display device 17a of the client apparatus 10. As a result, it is possible to more reliably prevent a situation where, when the server apparatus 20 starts the remote adjustment mode, the information on a basis of operations remotely input in the operation device 17 of the client apparatus 10 by the server apparatus 20 is displayed on the display device 17a, and a user thereby sees all the operational procedures to start the remote adjustment mode.

(2) According to the present embodiment, if the client apparatus 10 determines that a series of operational procedures remotely input in the operation device 17 by the server apparatus 20 subsequently to the first series of operational procedures is not the second series of operational procedures (Step S110, NO), the client apparatus 10 displays, on the display device 17a, information on a basis of a series of operational procedures after it is determined that a series of operational procedures is not the second series of operational procedures (Step S114). In other words, a series of operational procedures subsequent to the first series of operational procedures is displayed, on the display device 17a, only after it is determined that the series of operational procedures is the second series of operational procedures. So it is possible to more reliably prevent a situation where a user sees a part of the second series of operational procedures out of the operational procedures to start the remote adjustment mode.

(3) According to the present embodiment, the client apparatus 10 informs the server apparatus 20 that information on a basis of a series of operational procedures remotely input in the operation device 17 by the server apparatus 20 is displayed or un-displayed on the display device 17a (Step S109 or Step S115). As a result, an operator may know whether the first series of operational procedures and the second series of operational procedures are correctly input in the server apparatus 20 or wrong operational procedures are input.

It should be understood by those skilled in the art that various modifications, combinations, sub-combinations and alterations may occur depending on design requirements and other factors insofar as they are within the scope of the appended claims or the equivalents thereof

What is claimed is:

1. A client apparatus, comprising:
an operation device including hardware keys;
a display device including a touch panel; and
a controller circuit configured to
   establish remote connection with a server apparatus, and
   start a remote adjustment mode if a series of remote adjustment mode shifting operational procedures is detected, the remote adjustment mode being a mode for remotely adjusting the client apparatus by the server apparatus, wherein
the series of remote adjustment mode shifting operational procedures is a series of operational procedures for selecting objects displayed on the touch panel or the hardware keys in predetermined operational procedures, and includes a first series of operational procedures and a second series of operational procedures subsequent to the first series of operational procedures, and
the controller circuit is configured to
   display, on the display device, information on a basis of the series of operational procedures remotely input in the operation device by the server apparatus, the information on the basis of the series of operational procedures being information indicating the objects displayed on the touch panel or the hardware keys selected in the series of operational procedures,
   if it is determined that a series of operational procedures input in the operation device is a first series of operational procedures,
   un-display, on the display device, information on a basis of a series of operational procedures remotely input in the operation device by the server apparatus, subsequently to the first series of operational procedures, and
   if it is determined that the series of operational procedures input in the operation device subsequently to the first series of operational procedures is a second series of operational procedures, start the remote adjustment mode.

2. The client apparatus according to claim 1, wherein
the controller circuit is configured to
   after un-displaying, on the display device, information on a basis of a series of operational procedures remotely input in the operation device by the server apparatus, subsequently to the first series of operational procedures,
   if it is determined that the series of operational procedures remotely input in the operation device by the server apparatus subsequently to the first series of operational procedures is the second series of operational procedures,
   display, on the display device, information on a basis of a series of operational procedures remotely input in the operation device by the server apparatus, after it is determined that the series of operational procedures is not the second series of operational procedures.

3. The client apparatus according to claim 1, wherein
the controller circuit is configured to
   inform the server apparatus whether to display or un-display, on the display device, information on a basis of a series of operational procedures remotely input in the operation device by the server apparatus.

4. The client apparatus according to claim 1, wherein
the controller circuit is configured to
   display, on the display device, the information on a basis of the first series of operational procedures, and
   un-display, on the display device, the information on a basis of the second series of operational procedures.

5. A non-transitory computer readable recording medium that records a remote adjustment mode management program executable by a controller circuit of a client apparatus including an operation device including hardware keys and a display device including a touch panel, the remote adjustment mode management program causing the controller circuit of the client apparatus to
   establish remote connection with a server apparatus, and
   start a remote adjustment mode if a series of remote adjustment mode shifting operational procedures is detected, the remote adjustment mode being a mode for remotely adjusting the client apparatus by the server apparatus, wherein
the series of remote adjustment mode shifting operational procedures is a series of operational procedures for selecting objects displayed on the touch panel or the hardware keys in predetermined operational procedures, and includes a first series of operational procedures and a second series of operational procedures subsequent to the first series of operational procedures, and
the remote adjustment mode management program causes the controller circuit of the client apparatus to
   display, on the display device, information on a basis of the series of operational procedures remotely input in the operation device by the server apparatus, the information on the basis of the series of operational procedures being information indicating the objects displayed on the touch panel or the hardware keys selected in the series of operational procedures,
   if it is determined that a series of operational procedures input in the operation device is a first series of operational procedures,
   un-display, on the display device, information on a basis of a series of operational procedures remotely input in the operation device by the server apparatus, subsequently to the first series of operational procedures, and
   if it is determined that the series of operational procedures input in the operation device subsequently to the first series of operational procedures is a second series of operational procedures, start the remote adjustment mode.

6. A remote adjustment mode management system, comprising:
a server apparatus; and
a client apparatus,
the client apparatus including
an operation device including hardware keys,
a display device including a touch panel, and
a controller circuit configured to
    establish remote connection with a server apparatus, and
    start a remote adjustment mode if a series of remote adjustment mode shifting operational procedures is detected, the remote adjustment mode being a mode for remotely adjusting the client apparatus by the server apparatus, wherein
the series of remote adjustment mode shifting operational procedures is a series of operational procedures for selecting objects displayed on the touch panel or the hardware keys in predetermined operational procedures, and includes a first series of operational procedures and a second series of operational procedures subsequent to the first series of operational procedures, and
the controller circuit is configured to
    display, on the display device, information on a basis of the series of operational procedures remotely input in the operation device by the server apparatus, the information on the basis of the series of operational procedures being information indicating the objects displayed on the touch panel or the hardware keys selected in the series of operational procedures,
    if it is determined that a series of operational procedures input in the operation device is a first series of operational procedures,
    un-display, on the display device, information on a basis of a series of operational procedures remotely input in the operation device by the server apparatus, subsequently to the first series of operational procedures, and
    if it is determined that the series of operational procedures input in the operation device subsequently to the first series of operational procedures is a second series of operational procedures, start the remote adjustment mode.

* * * * *